United States Patent
Brown et al.

(10) Patent No.: US 11,660,930 B2
(45) Date of Patent: May 30, 2023

(54) ACTUATOR ASSEMBLY

(71) Applicant: DENSO International America, Inc., Southfield, MI (US)

(72) Inventors: Keniel Brown, Ferndale, MI (US); Brian Belanger, Farmington Hills, MI (US); Mark Rothenberg, Farmington Hills, MI (US); Brett Wilson, Allen Park, MI (US)

(73) Assignee: DENSO International America, Inc., Southfield, MI (US)

( * ) Notice: Subject to any disclaimer, the term of this patent is extended or adjusted under 35 U.S.C. 154(b) by 532 days.

(21) Appl. No.: 16/836,577

(22) Filed: Mar. 31, 2020

(65) Prior Publication Data

US 2021/0107330 A1    Apr. 15, 2021

Related U.S. Application Data

(60) Provisional application No. 62/914,737, filed on Oct. 14, 2019.

(51) Int. Cl.
*B60H 1/00* (2006.01)

(52) U.S. Cl.
CPC ....... *B60H 1/0065* (2013.01); *B60H 1/00664* (2013.01)

(58) Field of Classification Search
CPC .............. B60H 1/0065; B60H 1/00664; B60H 1/00857; F16H 1/32; F16H 1/28; F16H 1/46; F16H 2001/2881; F16H 57/08; F16H 25/18; F16H 37/12; F16H 53/025; F16H 53/06; F16H 1/2836; F16H 2057/085; F16H 25/16; F16H 27/04
See application file for complete search history.

(56) References Cited

U.S. PATENT DOCUMENTS

| | | | | |
|---|---|---|---|---|
| 3,442,146 A | * | 5/1969 | Simpson | F16H 27/04 74/435 |
| 3,637,036 A | * | 1/1972 | Swisher, Jr. | F16H 61/425 60/483 |
| 4,332,452 A | * | 6/1982 | Nakano | G03B 9/34 396/479 |
| 4,512,213 A | * | 4/1985 | Newton | F16H 1/32 475/179 |
| 4,665,769 A | * | 5/1987 | Parsons | F16H 48/10 475/174 |
| 4,795,867 A | * | 1/1989 | Ohi | B60H 1/00814 200/11 DA |
| 4,809,100 A | * | 2/1989 | Tanaka | G11B 15/10 360/96.1 |

(Continued)

FOREIGN PATENT DOCUMENTS

JP    2019038336 A  *  3/2019  ......... B60H 1/00857
KR    101492149 B1     2/2015

*Primary Examiner* — Nelson J Nieves
(74) *Attorney, Agent, or Firm* — Harness, Dickey & Pierce, P.L.C.

(57) ABSTRACT

An actuator assembly for actuating actuatable members. The actuator assembly includes an upper cam mounted to an upper side of a center plate. The upper cam is rotatable by a motor. A lower cam is mounted to a lower side of the center plate. The lower cam is rotatable by the motor. The upper cam and the lower cam are configured to rotate at different speeds and are configured to actuate linkages for moving the actuatable members.

12 Claims, 5 Drawing Sheets

(56) References Cited

U.S. PATENT DOCUMENTS

| | | | | |
|---|---|---|---|---|
| 4,876,794 A * | 10/1989 | Myers | | B26B 17/02 |
| | | | | 74/567 |
| 5,881,994 A * | 3/1999 | Stevenson | | B60H 1/00857 |
| | | | | 251/294 |
| 6,383,071 B1 * | 5/2002 | Takeuchi | | B60H 1/00857 |
| | | | | 454/333 |
| 6,702,008 B1 * | 3/2004 | Hibino | | B60H 1/00857 |
| | | | | 454/126 |
| 9,279,485 B2 | 3/2016 | Sokolofsky | | |
| 11,125,310 B2 * | 9/2021 | Nolta | | B60H 1/00857 |
| 2002/0108460 A1 * | 8/2002 | Nishishita | | B60H 1/00857 |
| | | | | 74/469 |
| 2002/0117296 A1 * | 8/2002 | Smith | | B60H 1/00028 |
| | | | | 165/42 |
| 2002/0195227 A1 * | 12/2002 | Ito | | B60H 1/00842 |
| | | | | 165/41 |
| 2003/0050001 A1 * | 3/2003 | Kamio | | B60H 1/345 |
| | | | | 454/155 |
| 2006/0084547 A1 * | 4/2006 | Dill | | B60N 2/2252 |
| | | | | 475/162 |
| 2008/0000537 A1 * | 1/2008 | Sokolofsky | | B60H 1/00857 |
| | | | | 137/865 |
| 2008/0032849 A1 * | 2/2008 | Briscoe | | F16C 19/30 |
| | | | | 475/331 |
| 2009/0156343 A1 * | 6/2009 | Stevenson | | G05G 1/10 |
| | | | | 474/167 |
| 2010/0206686 A1 * | 8/2010 | Johnson | | F16D 11/10 |
| | | | | 192/93 A |
| 2010/0263401 A1 * | 10/2010 | Sakakibara | | B60H 1/3421 |
| | | | | 62/408 |
| 2011/0162409 A1 * | 7/2011 | Okumura | | B60H 1/00857 |
| | | | | 137/637 |
| 2012/0318079 A1 * | 12/2012 | Weber | | B60H 1/00857 |
| | | | | 74/54 |
| 2015/0065031 A1 * | 3/2015 | Shibata | | B60H 1/3421 |
| | | | | 454/322 |
| 2017/0106722 A1 * | 4/2017 | Nolta | | B60H 1/00857 |
| 2018/0142768 A1 * | 5/2018 | Nolta | | B60H 1/00842 |
| 2018/0281561 A1 * | 10/2018 | Nolta | | B60H 1/00678 |
| 2019/0152290 A1 * | 5/2019 | Sokolofsky | | B60H 1/00857 |
| 2019/0232756 A1 * | 8/2019 | Matsuda | | B60H 1/00857 |
| 2019/0293337 A1 * | 9/2019 | Yokoe | | F25D 17/045 |
| 2020/0047585 A1 * | 2/2020 | Kawamoto | | B60H 1/0065 |
| 2020/0300340 A1 * | 9/2020 | Desjardins | | F16H 1/28 |
| 2022/0097489 A1 * | 3/2022 | Tang | | B60H 1/3421 |

* cited by examiner

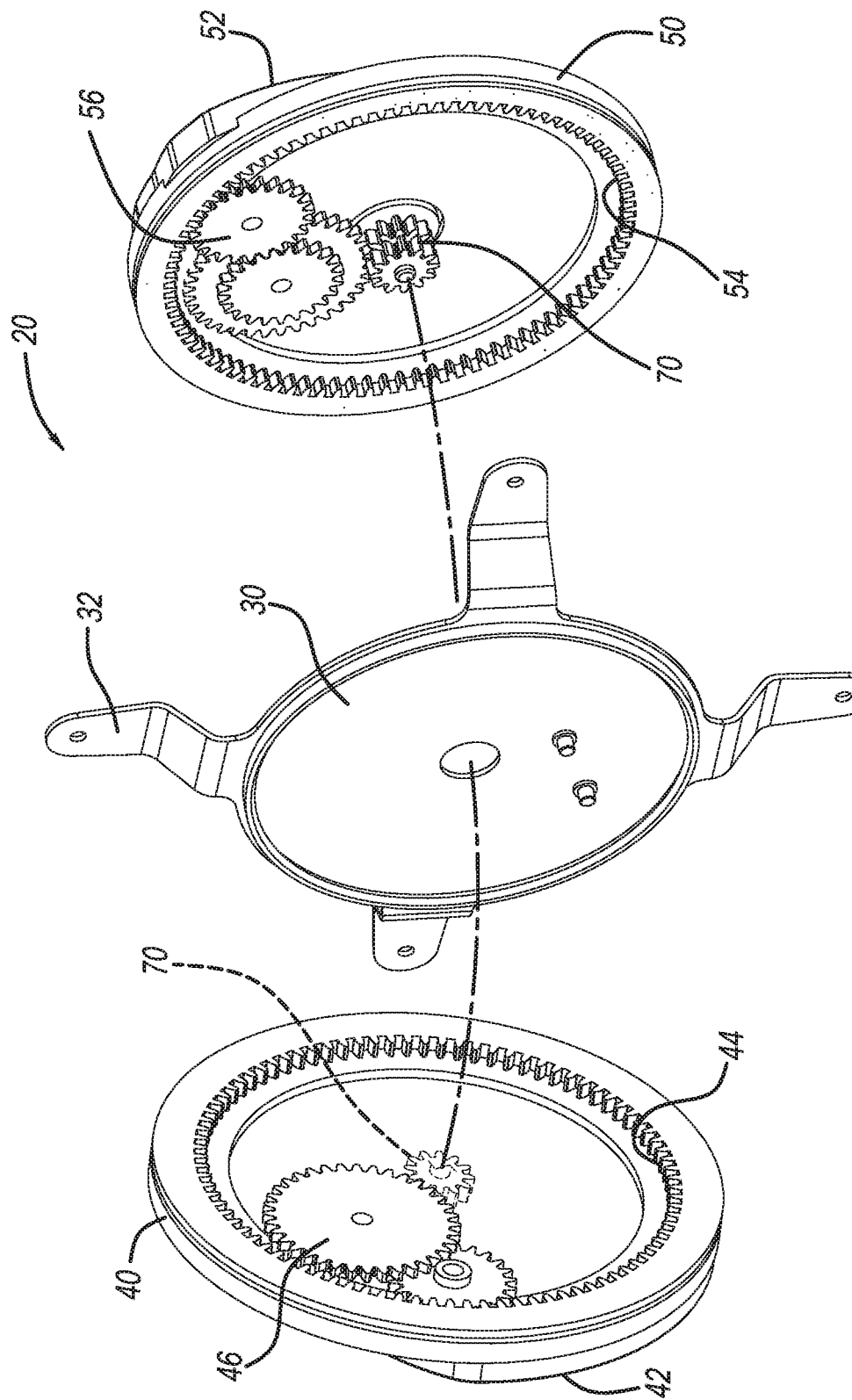

ACTUATOR ASSEMBLY

CROSS-REFERENCE TO RELATED APPLICATION

This application claims the benefit of U.S. Provisional Application No. 62/914,737 filed on Oct. 14, 2019, the entire disclosure of which is incorporated herein by reference.

FIELD

The present disclosure relates to an actuator assembly, such as, for example, a door actuator assembly for a heating, ventilation, and air conditioning (HVAC) system.

BACKGROUND

This section provides background information related to the present disclosure, which is not necessarily prior art.

Vehicle heating, ventilation, and air conditioning (HVAC) systems include a plurality of airflow control doors movable to control airflow through various outlets of a case of the HVAC system. The doors are controlled by a servo unit mounted directly to an exterior of the HVAC case. Actuation of the servo turns a cam, which moves a linkage, which changes the positions of the doors or any other members to be actuated. While such actuation systems are suitable for their intended use, they are subject to improvement. For example, existing actuation systems protrude from the HVAC case, which increases the footprint of the HVAC case. An improved door actuation system with a reduced footprint would therefore be desirable.

SUMMARY

This section provides a general summary of the disclosure, and is not a comprehensive disclosure of its full scope or all of its features.

The present disclosure provides for an actuator assembly for actuating actuatable members. The actuator assembly includes an upper cam mounted to an upper side of the center plate. The upper cam is rotatable by a motor. A lower cam is mounted to a lower side of the center plate. The lower cam is rotatable by the motor. The upper cam and the lower cam are configured to rotate at different speeds and configured to actuate linkages for moving the doors.

The present disclosure further provides for an actuator assembly for actuating doors of a heating, ventilation, and air conditioning (HVAC) system. The actuator assembly includes a center plate and an upper cam mounted to an upper side of the center plate. The upper cam includes an upper groove on an upper side of the upper cam and upper teeth extending about a lower side of the upper cam. Upper gears are in cooperation with the upper teeth such that rotation of the upper gears rotates the upper cam. A lower cam is mounted to a lower side of the center plate. The lower cam includes a lower groove on a lower side of the lower cam and lower teeth extending about an upper side of the lower cam. Lower gears are in cooperation with the lower teeth such that rotation of the lower gears rotates the lower cam. A center shaft is in cooperation with the upper gears and the lower gears to rotate the upper gears and the lower gears. The upper gears are configured separately from the lower gears such that the upper gears and lower gears rotate the upper cam and the lower cam at different speeds.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 6 is another view of the actuator assembly of FIG. 2.

Corresponding reference numerals indicate corresponding parts throughout the several views of the drawings.

DETAILED DESCRIPTION

Example embodiments will now be described more fully with reference to the accompanying drawings.

Figure 1:
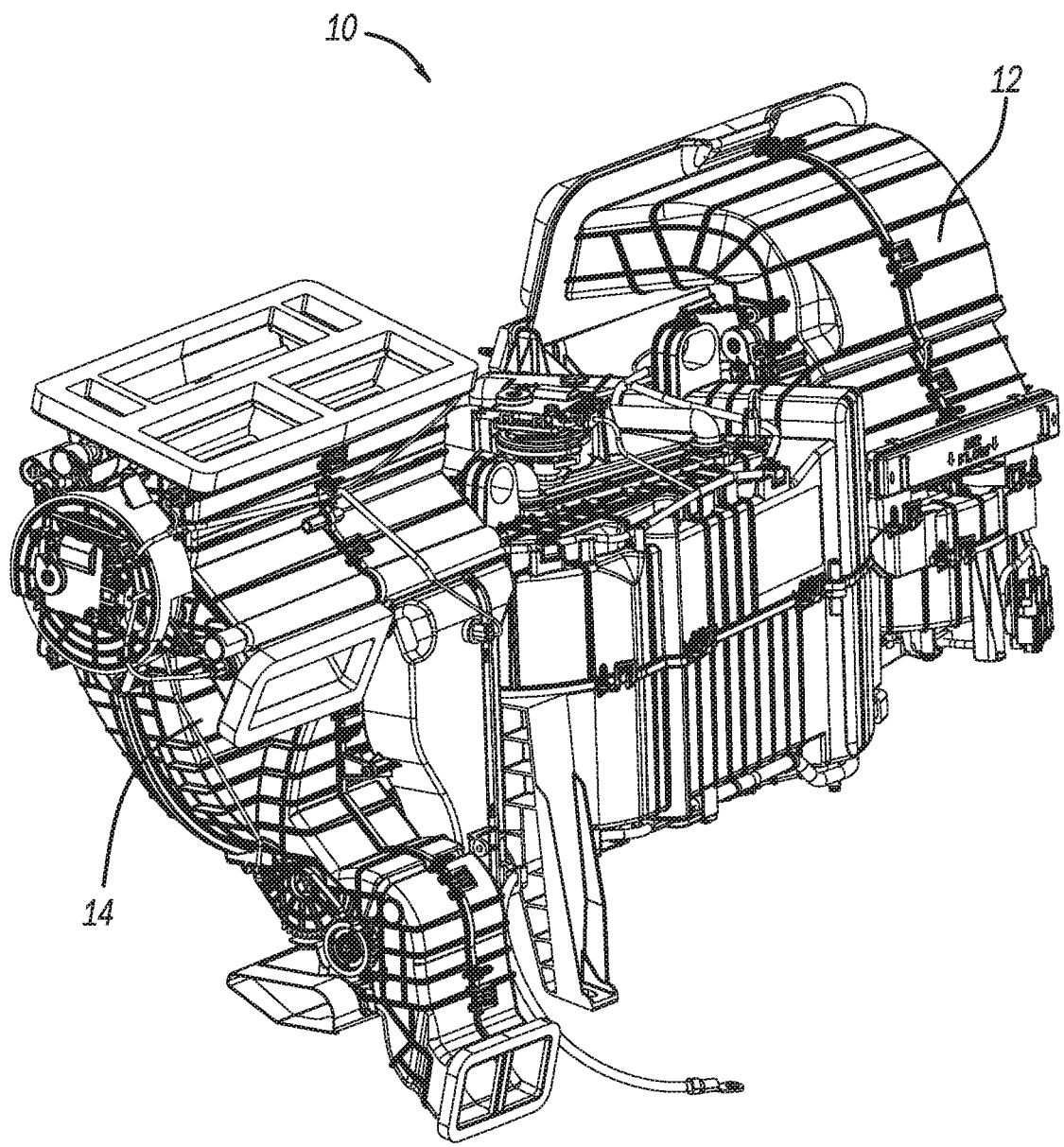
FIG. 1 illustrates an exemplary heating, ventilation, and air conditioning (HVAC) system for a vehicle.

FIG. 1 illustrates an exemplary heating, ventilation and air conditioning (HVAC) system 10 for a vehicle. The HVAC system 10 may be configured for use in any suitable vehicle, such as any suitable passenger vehicle, mass transit vehicle, utility vehicle, construction vehicle/equipment, military vehicle/equipment, watercraft, aircraft, etc. The HVAC system 10 may also be configured for any suitable non-vehicular use as well.

The HVAC system 10 includes a blower 12 and a heater case/plenum 14. The blower 12 generates airflow, which is directed to and through the heater case/plenum 14. The heater case/plenum 14 may include any suitable heating and cooling elements, such as an evaporator and heater core. The heater case/plenum 14 includes numerous outlets for directing airflow to various locations. For example, the heater case/plenum 14 may include face outlets, foot outlets, rear outlets, defrost outlets and demist outlets. The heater case/plenum 14 includes a plurality of doors which are movable to control airflow through the various outlets.

Figure 2:
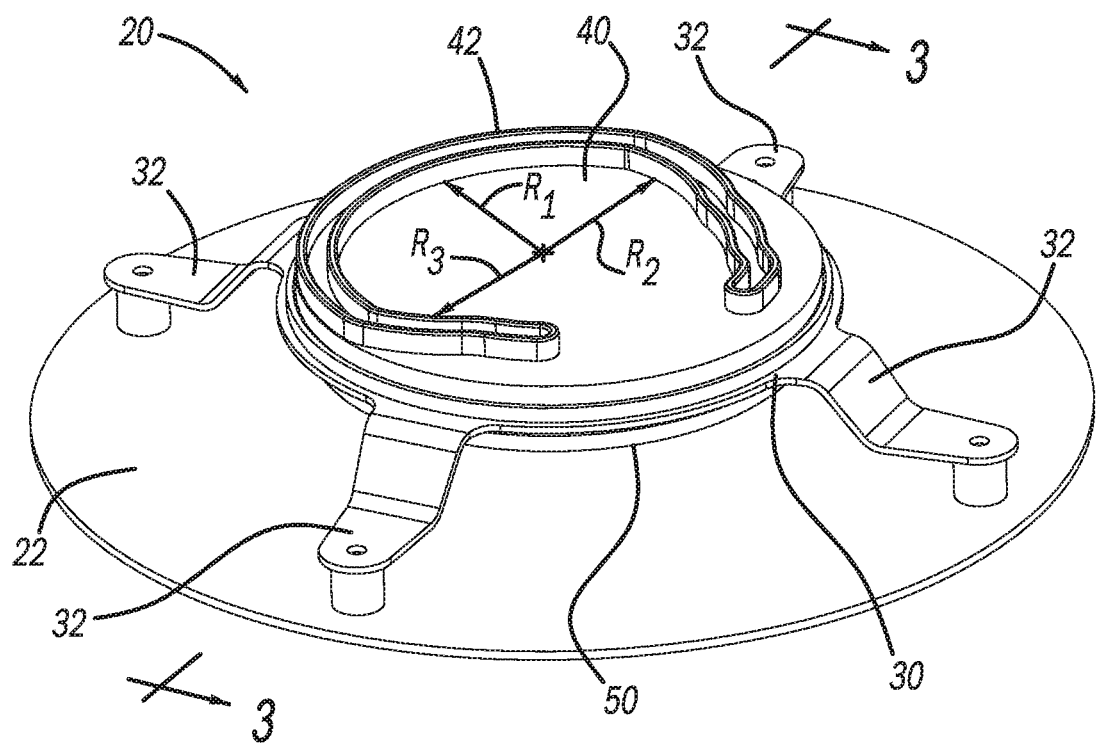
FIG. 2 illustrates an actuator assembly in accordance with the present disclosure for moving doors of the HVAC system of FIG. 1.

FIG. 2 illustrates an exemplary actuator assembly 20 in accordance with the present disclosure for rotating one or more doors of the heater case/plenum 14. The actuator assembly 20 may be configured for use in any other suitable application as well. For example, the actuator assembly 20 may be configured for use with any assembly that uses an actuator and linkage to actuate a member, such as a door, divider, wall, tool, etc.

The actuator assembly generally includes a center plate 30, which is mounted to any suitable surface 22 depending on the application. For example, the surface 22 may be a surface of the HVAC heater case/plenum 14. The center plate 30 is mounted to the surface 22 by way of a plurality of support arms 32. The support arms 32 are secured to the surface 22 in any suitable manner.

With reference to FIGS. 2-6, mounted to an upper surface of the center plate 30 is an upper cam 40. The upper cam 40 includes an upper groove 42. The upper groove 42 has various different radii R1, R2, and R3. The upper groove 42 may include any suitable number of different radii to accommodate any suitable number of different door linkages linking the actuator assembly 20 to doors of the heater case/plenum 14. As a result of the different radii R1, R2, R3, each linkage associated with the different radii R1, R2, R3 moves at a different speed and/or distance. As a result, the doors associated with the different linkages will move at different speeds and/or distances. Extending about a circumference of an undersurface of the upper cam 40 are a plurality of teeth 44. The teeth 44 are configured to mesh with one of a plurality of gears 46.

Mounted at a lower surface of the center plate 30 is a lower cam 50. The lower cam 50 includes a lower groove 52 on a lower side of the lower cam 50. The lower groove 52 has a plurality of different radii. Each portion of the lower groove 52 having a different radii may accommodate a different linkage coupled to a different door of the heater case/plenum 14. Due to the different radii, as the lower cam 50 rotates the different linkages will move at different speeds and distances, resulting in the associated doors moving at different speeds and distances. The lower groove 52 may have radii that are the same as, or different than, the radii R1, R2, R3 of the upper groove 42. At an upper surface of the lower cam 50 are a plurality of teeth 54. The teeth 54 extend about a circumference of the upper surface of the lower cam 50 and are configured to mesh with one of gears 56.

Figure 3:
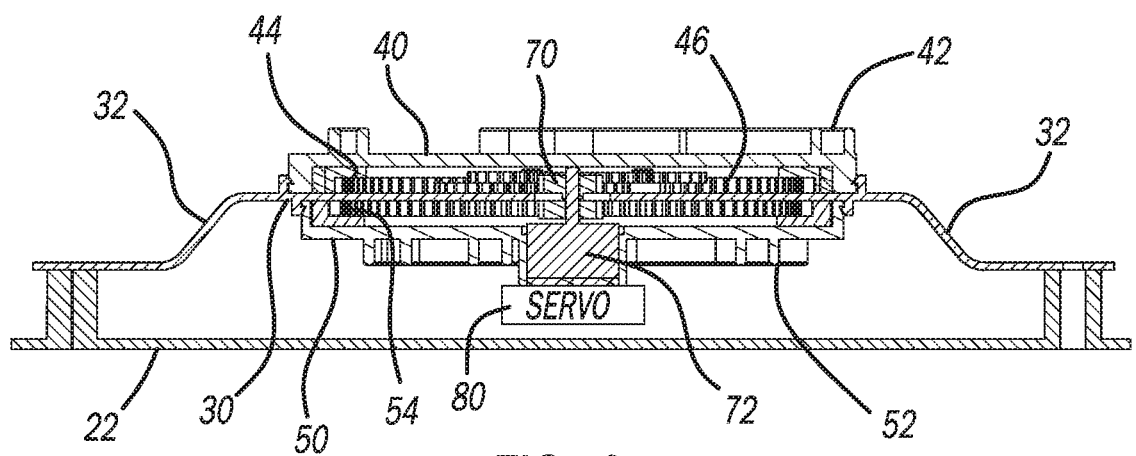
FIG. 3 is a cross-sectional view taken along line 3-3 of FIG. 2.
Figure 4:
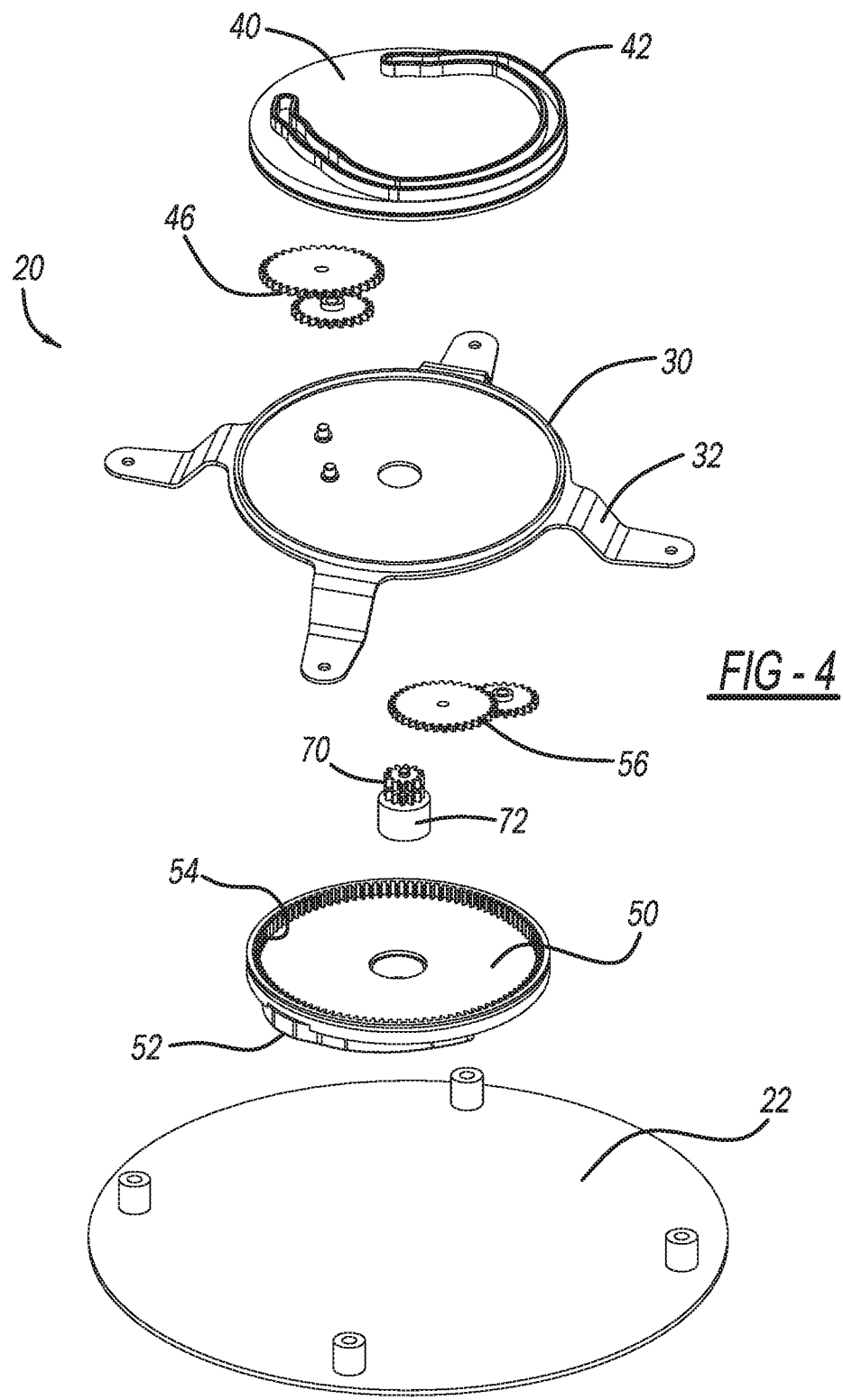
FIG. 4 is an exploded view of the actuator assembly of FIG. 2.
Figure 5:
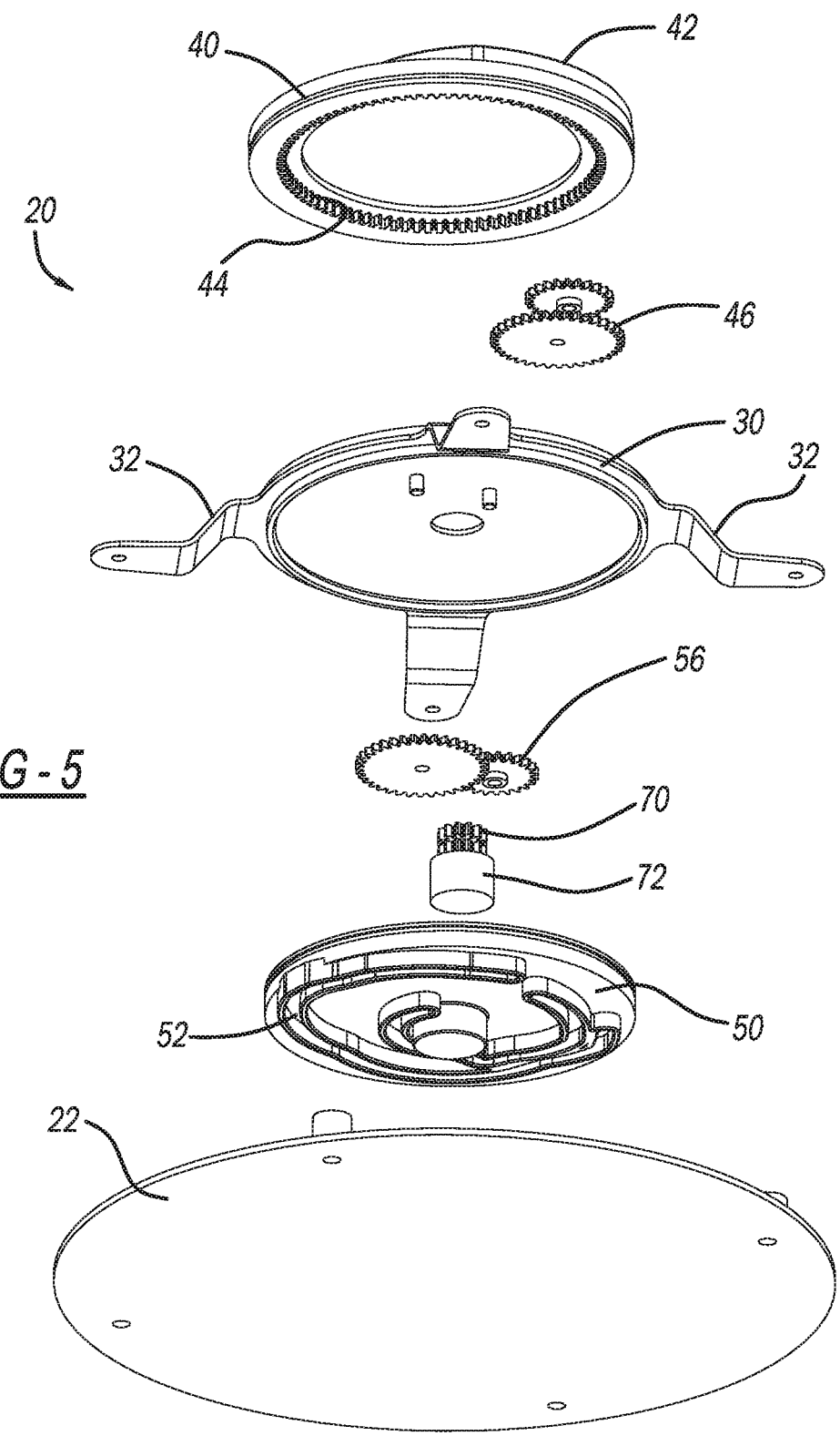
FIG. 5 is another exploded view of the actuator assembly of FIG. 2.

With particular reference to FIGS. 3 and 6, the upper gears 46 and the lower gears 56 both mesh with a center gear 70. The center gear 70 extends through a center aperture defined by the center plate 30. The center gear 70 is connected to a center shaft 72, which is rotated by any suitable servo 80. The servo 80 may be mounted to the lower cam 50.

FIG. 6 illustrates the upper gears 46 meshed with the teeth 44 and the center gear 70. FIG. 6 also illustrates the lower gears 56 meshed with the teeth 54 and the center gear 70. The upper gears 46 and the lower gears 56 may be geared differently. In other words, the upper gears 46 and the lower gears 56 may have different gear reductions. Thus, rotation of the center gear 70 results in the upper cam 40 and the lower cam 50 rotating at different speeds.

The present disclosure thus advantageously provides an actuator assembly 20 that takes up less packaging space as compared to previous servo, cam and linkage assemblies. The actuator assembly 20 advantageously provides a single unit including the upper cam 40, the lower cam 50, and the servo 80. The actuator assembly 20 requires fewer components than previous assemblies, is easier to manufacture, and less costly overall, such as in terms of manufacturing costs and assembly costs for example. The ability to rotate the upper cam 40 and the lower cam 50 at different speeds increases the possibility of implementing higher efficiency door linkage strategies without increasing the complexity and/or cost of the overall door linkage system. One skilled in the art will appreciate that the present disclosure provides numerous additional advantages and unexpected results as well. Unification of the upper and lower cams 40, 50 and the servo 80 into the single actuator assembly 20 advantageously reduces the packaging space required by the heater case/plenum 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An actuator assembly for actuating actuatable members, the actuator assembly comprising:
   a center plate;
   an upper cam mounted to an upper side of the center plate, the upper cam rotatable by a motor;
   a lower cam mounted to a lower side of the center plate, the lower cam rotatable by the motor;
   a center gear rotatable by the motor, the motor being a servo;
   upper gears in cooperation with the center gear and the upper cam; and
   lower gears in cooperation with the center gear and the lower cam;
   wherein the upper cam and the lower cam are configured to rotate at different speeds and are configured to actuate linkages for moving the actuatable members; and
   wherein the upper gears and the lower gears have different gear reductions.

2. The actuator assembly of claim 1, wherein the upper cam includes upper internal teeth configured to mesh with at least one of the upper gears, and the lower cam includes lower internal teeth configured to mesh with at least one of the lower gears.

3. The actuator assembly of claim 1, wherein the upper cam includes an upper groove configured to cooperate with the linkages for moving the actuatable members; and
   wherein the actuatable members are doors of a heating, ventilation, and air conditioning (HVAC) system.

4. The actuator assembly of claim 3, wherein the upper groove includes a plurality of different radii.

5. The actuator assembly of claim 4, wherein the lower cam includes a lower groove configured to cooperate with the linkages for moving the doors.

6. The actuator assembly of claim 5, wherein the lower groove includes a plurality of different radii.

7. An actuator assembly for actuating doors of a heating, ventilation, and air conditioning (HVAC) system, the actuator assembly comprising:
   a center plate;
   an upper cam mounted to an upper side of the center plate, the upper cam including an upper groove on an upper side of the upper cam and upper teeth extending about a lower side of the upper cam;
   upper gears in cooperation with the upper teeth such that rotation of the upper gears rotates the upper cam;
   a lower cam mounted to a lower side of the center plate, the lower cam including a lower groove on a lower side of the lower cam and lower teeth extending about an upper side of the lower cam;
   lower gears in cooperation with the lower teeth such that rotation of the lower gears rotates the lower cam; and
   a center shaft in cooperation with the upper gears and the lower gears to rotate the upper gears and the lower gears;
   wherein the upper gears are configured differently from the lower gears such that rotation of the upper gears and lower gears rotates the upper cam and the lower cam at different speeds.

8. The actuator assembly of claim 7, wherein the upper gears and the lower gears have different gear reductions.

9. The actuator assembly of claim 7, further comprising a servo configured to rotate the center shaft.

10. The actuator assembly of claim 9, wherein the center plate is mounted to a heater case of the HVAC system and the servo is mounted to the lower cam.

11. The actuator assembly of claim 7, wherein the upper groove includes a plurality of different radii.

12. The actuator assembly of claim 11, wherein the lower groove includes a plurality of different radii.

* * * * *